United States Patent
Small (10) Patent No.: US 7,945,225 B2
(45) Date of Patent: May 17, 2011

(54) MEDIUM LOSS HIGH POWER IBOC COMBINER

(75) Inventor: Derek J. Small, Raymond, ME (US)

(73) Assignee: MYAT, Inc., Mahwah, NJ (US)

( * ) Notice: Subject to any disclaimer, the term of this patent is extended or adjusted under 35 U.S.C. 154(b) by 498 days.

(21) Appl. No.: 12/217,812

(22) Filed: Jul. 9, 2008

(65) Prior Publication Data

US 2009/0041157 A1 Feb. 12, 2009

Related U.S. Application Data

(60) Provisional application No. 60/958,784, filed on Jul. 9, 2007.

(51) Int. Cl.
*H04B 17/02* (2006.01)
(52) U.S. Cl. .......... 455/137; 455/180.1; 455/273; 455/176.1; 333/124; 375/216
(58) Field of Classification Search .......... 455/137, 455/180.1, 273, 176.1, 278.1; 333/124, 24.2; 370/487; 375/216, 259, 260
See application file for complete search history.

(56) References Cited

U.S. PATENT DOCUMENTS

| | | | | |
|---|---|---|---|---|
| 5,757,854 A | * | 5/1998 | Hunsinger et al. | 375/260 |
| 5,850,415 A | * | 12/1998 | Hunsinger et al. | 375/216 |
| 5,898,732 A | * | 4/1999 | Dapper et al. | 375/268 |
| 5,949,796 A | * | 9/1999 | Kumar | 370/529 |
| 6,005,894 A | * | 12/1999 | Kumar | 375/270 |
| 6,246,698 B1 | * | 6/2001 | Kumar | 370/487 |
| 6,259,893 B1 | * | 7/2001 | Kroeger et al. | 455/61 |
| 6,384,695 B2 | * | 5/2002 | Kpodzo et al. | 333/124 |
| 6,510,175 B1 | * | 1/2003 | Hunsinger et al. | 375/216 |
| 6,622,008 B2 | * | 9/2003 | Kroeger et al. | 455/61 |
| 6,792,051 B1 | * | 9/2004 | Mohan et al. | 375/324 |
| 6,934,514 B2 | * | 8/2005 | Stenberg | 455/45 |
| 7,127,008 B2 | * | 10/2006 | Kroeger | 375/321 |
| 7,224,400 B2 | | 5/2007 | Plonka | |
| 2002/0187759 A1 | * | 12/2002 | Stenberg | 455/117 |
| 2009/0086833 A1 | * | 4/2009 | Chalmers et al. | 375/260 |

\* cited by examiner

*Primary Examiner* — Minh D Dao
(74) *Attorney, Agent, or Firm* — Karl F. Milde, Jr.; Eckert Seamans Cherin & Mellott, LLC (57) ABSTRACT

A method and apparatus are disclosed for combining digital sidebands with an FM analog signal for IBOC transmission by a single antenna. Specifically, a high power filter combiner for combining an FM analog and a digital signal of the same channel, or frequency, is disclosed. The combiner has two inputs that respectively receive an FM analog and a digital signal to be transmitted in the same FM channel. The combiner has mild tuned filters interposed between the inputs and the output which are tuned to pass the FM analog signal while reflecting the digital signal such that the passed FM analog signal and the reflected digital signal combine as IBOC, i.e., an FM analog signal with digital sideband signals. The combined IBOC signal is provided at an output of the combiner, capable for transmission through a single antenna.

19 Claims, 13 Drawing Sheets

MEDIUM LOSS HIGH POWER IBOC COMBINER

CROSS REFERENCE TO RELATED APPLICATION

This application claims priority from U.S. provisional application No. 60/958,784, filed Jul. 9, 2007.

BACKGROUND OF THE INVENTION

Figure 1:
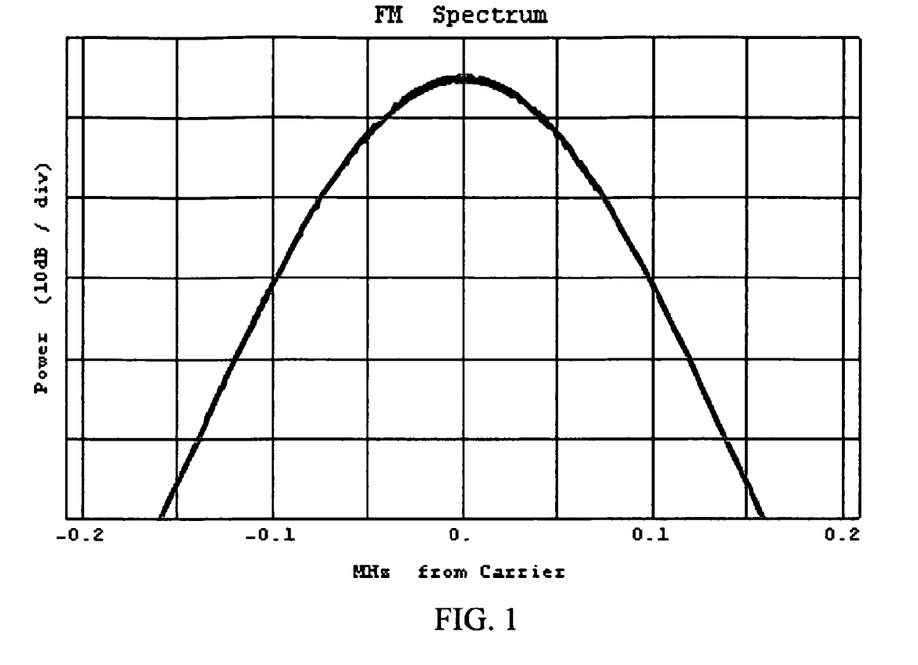
FIG. 1 is a spectrum diagram of a typical FM channel.
Figure 2:
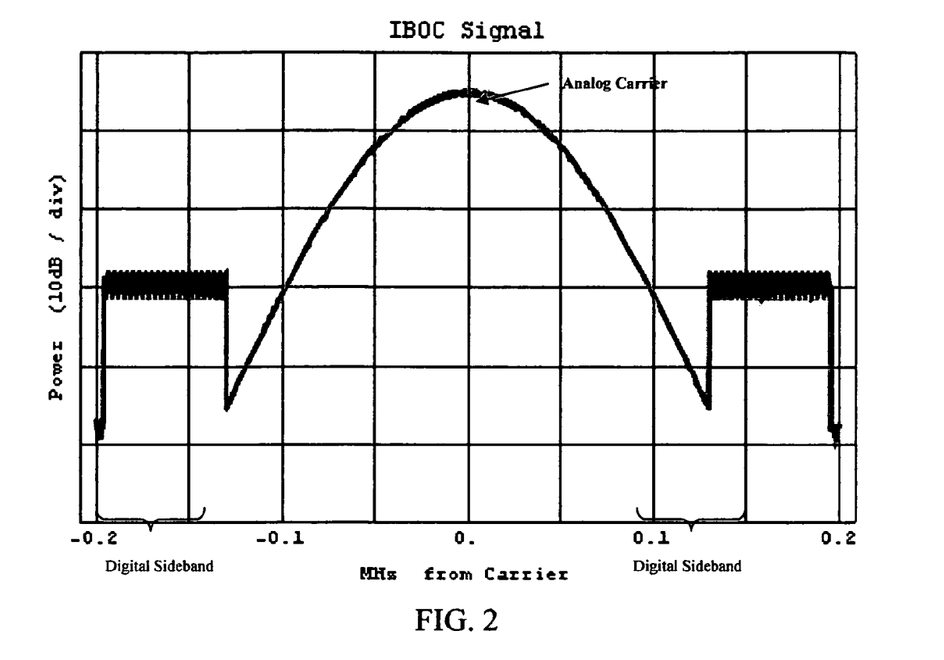
FIG. 2 is a spectrum diagram of an In-Band-On-Channel (IBOC) FM channel showing an analog signal combined with digital sideband signals.

FM radio frequency ("RF") signals have been traditionally broadcast in an analog format, and therefore transmission systems have largely remained unchanged. See FIG. 1. Recently, the Federal Communications Commission ("FCC") has accepted a new digital format known as In-Band-On-Channel ("IBOC"), as a method of transmitting digital information on FM radio signals. IBOC requires the simultaneous broadcast of an analog and a digital signal within one channel of the FM band. By utilizing digital sub-carriers, see, e.g., FIG. 2, digital information is placed on both sides of the FM analog signal allowing IBOC transmission of the digital information, and alleviating the complications of requiring a separate channel allocated to the digital signal, during the period of transition from analog radio to digital radio. Accordingly, IBOC is a hybrid mode of transmission, where both analog and digital signals are broadcast together on a single channel, and eventually, the analog FM will be dropped for the all-digital signal with room for more information.

The strategy of combining separate analog and digital signals involves at least two important requirements. The first requirement is to design a filter that meets the FCC mask requirements for the combined digital and analog signal. The second requirement is to combine the two signals into one antenna without degrading either signal. Currently, digital sidebands are $\frac{1}{100}^{th}$, or −20 dB, of the power in the analog signal, which often results in poor reception of the IBOC signal. Therefor, it may be necessary in the future to increase the digital power another 10 dB, or $\frac{1}{10}^{th}$ the power of the analog signal.

There are currently four different strategies proposed for transmitting an analog signal and a digital signal together.

The methods of combining the digital and analog signals consist of:

1) Common Amplification: A low power level combiner is used before the signal is amplified. This method becomes difficult to implement in high power transmitters due to the high peak to average ratio of the digital signal. The transmitters cannot handle the high peak powers.

2) High Level Combining: A high power combining system where a directional coupler is used to inject the digital signal. The analog signal is run through the main line of the coupler while the digital signal is input to the coupled line. The coupling value is typically −10 dB resulting in significant losses (90%) to the digital signal and therefore requires a transmitter with 10 dB more power than required. The lost power is dumped into a dumpy load where it is dissipated into heat. There is also 10% loss of the analog signal which requires existing transmitters to increase power to maintain coverage. Most high power analog transmitters do not have this kind of headroom.

3) Mid Level Combining: A high power combining system where a directional coupler is also used to inject the digital signal. This differs from high level combining in that the digital transmitter has some common amplification (analog and digital) allowing reduced coupling values thereby minimizing digital and analog losses. In mid level combining, the digital losses exceed 3-6 dB. See U.S. Published Patent Application No. 20050190851, to Cabrera.

4) The use of separate antennas or orthogonally fed antennas. The obvious drawback to this strategy is the cost of the duplicative antenna and the transmission equipment needed.

In the field of terrestrial FM broadcast, high power RF filters are used for several applications. Generally, high power filters; bandpass, notch, lowpass, and highpass, are used to attenuate unwanted signals or to combine several stations to one transmission line or to combine two or more different channels to one transmission line. Unwanted signals include out-of-band emissions generated at the transmitter and signals coming back down the antenna. RF filters used for channel combining applications are designed to ensure low losses for each channel being combined.

Figure 3:
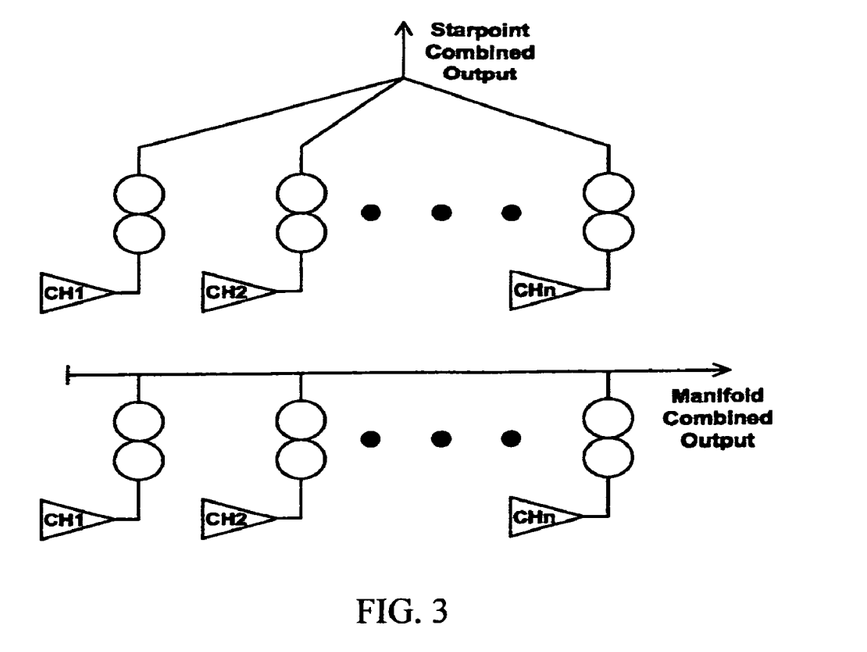
FIG. 3 is block diagram of a junction combiner.

Channel combiners take the form of junction combiners, e.g., tar point and manifold (FIG. 3) and directional filter modules. See, e.g., FIG. 4. Referring to FIG. 3, junction combiners can either be "manifold" or "starpoint" combiners. In both cases, each channel passes through its own filter and proceeds toward the junction. When the signal reaches the junction, it is split and delivered toward other filters. When the split signals reach the other channel filters, they are fully reflected and returned toward the junction. The line lengths between other filters and junctions are phased, or, separated in distance, so that they re-combine and are sent to the output.

Figure 4:
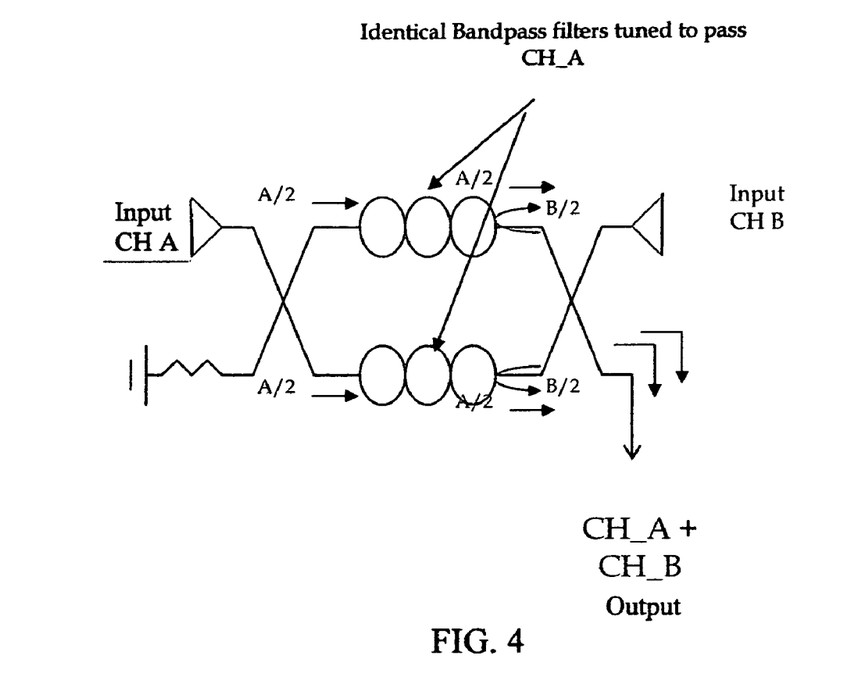
FIG. 4 is a block diagram of a high power FM directional combiner.

Similarly, high power FM directional combiners are used to combine separate high power FM channels for transmission by one antenna. See, e.g., FIG. 5. Typically, 3 and 4-section filters are used. Quadrature hybrids are used to split and recombine coherent signals. Referring to FIG. 4, Channel A is split in the first hybrid and passes through the filters. The signal is then recombined in the output hybrid and directed to the output. Channel B is delivered to the output hybrid, split and then reflected off the filters which are tuned to pass only Channel A. The filters provide enough rejection (typically about 30 dB), to fully reflect Channel B, where Channel B is recombined and sent to the output port with Channel A. The load is sized to absorb reflected power from Channel A input due to filter reflection coefficient and any power from input Channel B that passes through the filters due to imperfect rejection.

Figure 5:
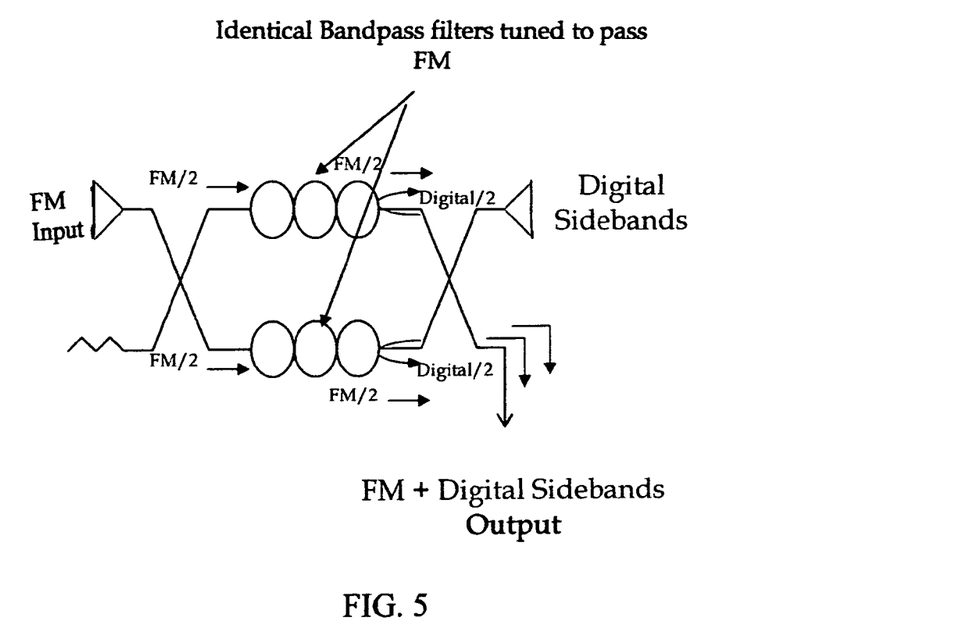
FIG. 5 is a schematic diagram of a sharp-tuned high power FM directional combiner.
Figure 6:
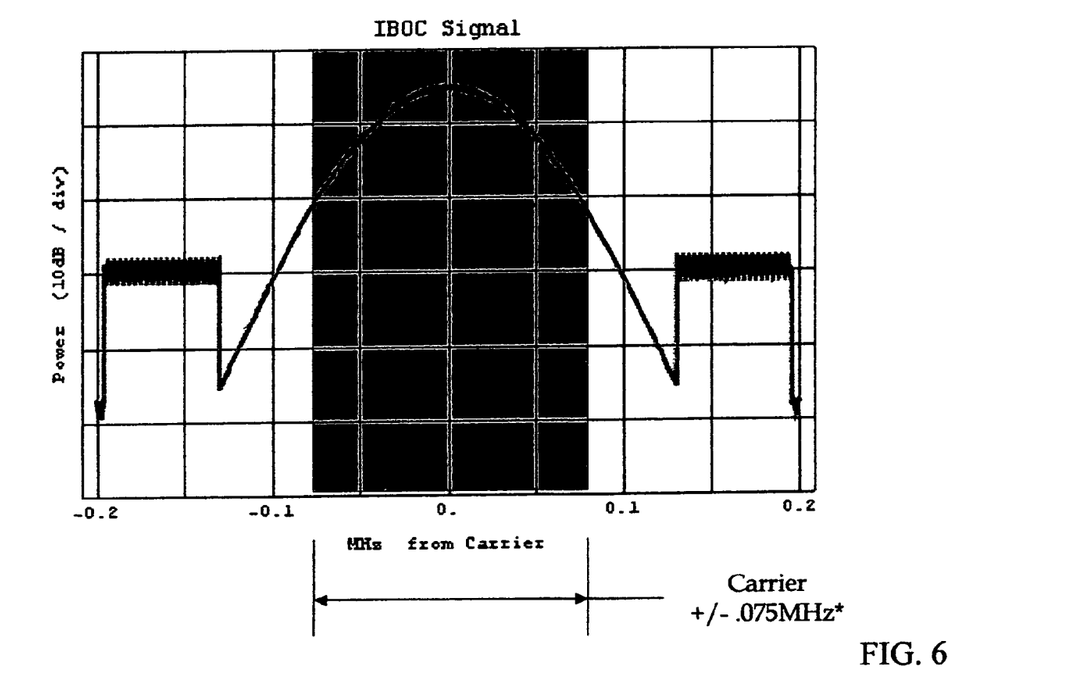
FIG. 6 is a spectrum diagram of an IBOC signal, showing analog FM with digital sidebands and showing where the main power is.
Figure 7:
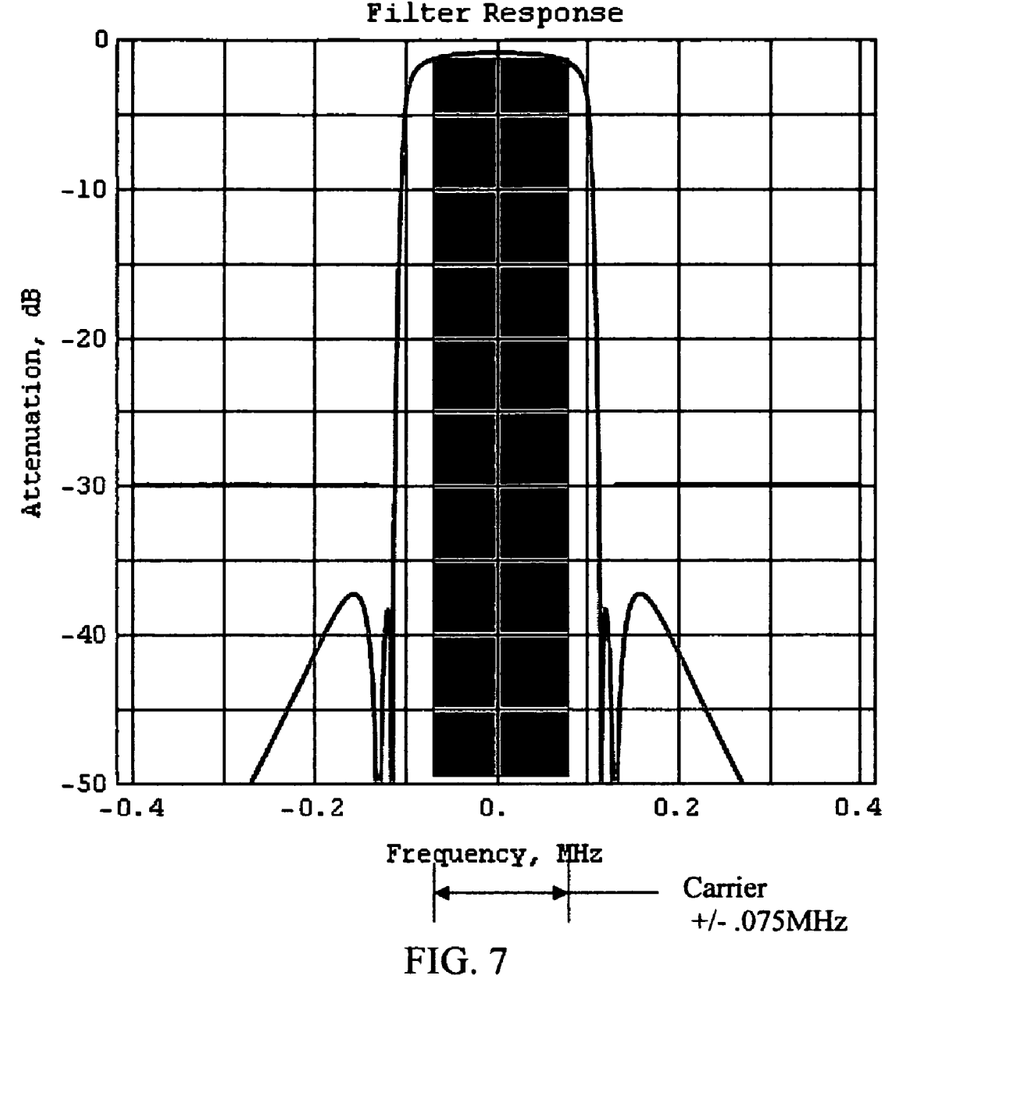
FIG. 7 is a diagram of the sharp tuned filter response, or filter rejection, of a high power FM directional combiner, showing attenuation vs. frequency.
Figure 8:
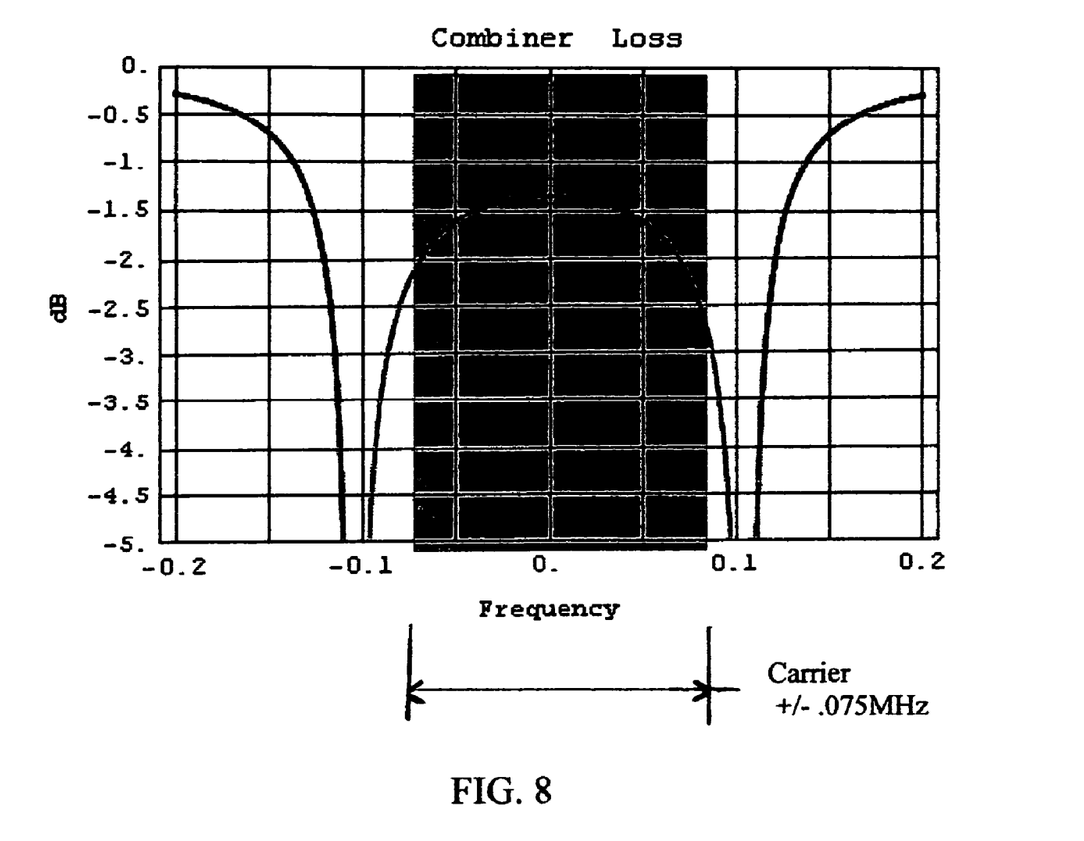
FIG. 8 is a diagram of the combiner losses of a sharp tuned high power FM directional combiner, showing loss (dB) vs. frequency.

It has been postulated that the high power FM directional combiner could be used to combine an analog FM signal with digital sidebands within the same channel (FIG. 5). Plonka combined adjacent TV channels using a directional combiner with "sharp tuned" filters. See U.S. Pat. No. 7,224,400 to Plonka. Referring to FIG. 6, which is a spectrum diagram of an IBOC signal at a specific frequency, the bandpass filter needs to straddle the FM carrier frequency by +/−0.075 MHz because this is where most of the FM power is. In order to do this, the filter rejection would need to be approximately −30 dB at carrier +/−0.13 MHz, where the digital sidebands are (+/−0.1 MHz for an extended mode). This results in a narrow filter with exceptionally high loss on the analog signal. An example of the sharp tuned filter response, or filter rejection, is shown in FIG. 7. The −30 dB rejection requirement is for low loss digital sideband combining. When this filter rejection requirement is met, the resulting combiner losses to the analog FM signal is unacceptable. Referring to FIG. 8, the resulting FM analog loss using a sharp tuned filter is seen to be about 1.4 dB mid-band, with 0.9 dB loss variation and 1.7 dB integrated loss over carrier +/−0.075 MHz. The integrated digital sideband loss, however, is 0.57 dB with 1.25 dB loss variation.

Thus, while the digital loss for a sharp tuned filter was better than previous systems, i.e., 0.57 dB vs. 3 to 6 dB, the analog FM loss was unworkable. That is, the loss variation is uncorrectable because there is too much delay and amplitude variation. Also, the mid-band loss and the integrated loss over carrier is too large. To compensate for these losses, the signal would have to be excessively amplified, and the existing transmitters do not have the head room to provide this amplification. Moreover, the 8-section filters that would be required make the size of the combiner itself much too large and run too hot due to dissipated losses.

Accordingly, a need exists for a high power combiner to combine an FM analog signal with digital sidebands within the same channel without excessive loss of signal, such that the combiner losses would be acceptable without the need for an oversized, and expensive, combiner.

The present invention provides a solution to the above problems by providing a high power FM combiner comprising a "mild tuned" filter. Applicants have surprisingly found that by using a mild tuned filter, heretofore unknown in the art for combining an analog FM signal and digital sidebands in the same channel, results in an IBOC signal with moderate but acceptable losses in both the analog and digital signals. The analog losses can be corrected by amplification in a range that can be accommodated by existing transmitters with sufficient headroom. Similarly, the loss and delay variations are correctable by methods know to those of skill in the art. Further, the within invention obviates the need for 8-section filters, because 4-sections filters are sufficient. Such 4-section filters are both smaller and less costly.

In addition to the above features, the invention may be implemented easily without adding significant cost or complexity above the current high power FM combiners, and avoids the need for more than one antenna for transmission.

OBJECTS OF THE INVENTION

It is therefore an object of the invention to provide a high power IBOC combiner.

It is also an object of the invention to provide a high power IBOC combiner with a mild tuned RF filter.

It is a further object of the invention to provide a high power IBOC combiner with a mild tuned RF filter that provides a response with acceptable FM analog and digital losses.

It is a still further object of the invention to provide a system and apparatus that combines the outputs of FM analog and digital power amplifiers ("PAs") to an IBOC signal for transmission by a single output for transmission, which may be a single antenna, said system comprising two inputs, one for the analog FM signal and one for the digital signal, mild tuned bandpass filtering and one output that produces an IBOC spectrum for broadcast transmission.

It is a yet further object of the invention to provide a method for combining an FM analog signal with a digital signal by using mild tuned bandpass filtering that passes the FM signal with a correctable amount of distortion and only partially reflects the digital signal to produce an output of low loss FM analog and some loss to the digital signals.

These and other objects of the invention will become more apparent in the description below.

SUMMARY OF THE INVENTION

The invention concerns the combining of digital sideband signals to an FM analog signal using a high power IBOC combiner having mild tuned filters to produce a combined signal having acceptable filter losses.

The present invention therefor provides an apparatus that combines the outputs of FM analog and digital PAs to one output load, which could be a broadcast antenna. The apparatus has two inputs, one for the analog signal and one for the digital signal, and one output that produces an IBOC spectrum for broadcast transmission. The combiner has mild tuned bandpass filters that pass the FM signal with a correctable amount of distortion and only partial reflection of the digital signal to produce an output with low loss FM and some loss to the digital signal. The lost digital signal is delivered to a dump load where it is absorbed.

The output from an FM analog PA is input into one of two inputs of the apparatus of the invention. The analog signal is then split by a quadrature hybrid and directed to identical bandpass filters which are mild tuned to pass the analog signal with a correctable amount of distortion. After passing through the filters, the analog signal is recombined by a second quadrature hybrid and directed to the output of the apparatus. At the same time, the output from a digital PA is input into the other input of the apparatus. The digital signal is also split by the second quadrature hybrid and directed to the mild tuned filters. Because the mild tuned filters are tuned to pass the analog signal, the digital signal is reflected with some loss. The reflected digital signal is recombined at the second quadrature hybrid and directed to the output of the apparatus, where it becomes combined with the analog signal as an IBOC. The lost digital signal is delivered to a dump load where it is absorbed.

In another aspect of the invention, the apparatus may use mild tuned notch filters that are tuned to partially pass the digital with a correctable amount of distortion, and reflect the FM analog signal, to produce an output of low loss FM analog and some loss to the digital signal.

This IBOC may then be directed to a single output, such as a single antenna for broadcast transmission.

For a full understanding of the present invention, reference should now be made to the following detailed description of the preferred embodiments of the invention as illustrated in the accompanying drawings.

DETAILED DESCRIPTION OF THE PREFERRED EMBODIMENTS

Definitions

For purposes of this invention, the terms "analog FM signal," "analog signal" and "FM signal" will be synonymous, and will refer to a radio frequency signal that is a frequency modulated analog signal. These terms may be used interchangeably. The term "digital signal" shall mean an RF signal in digital format that shall be at the same frequency as an analog signal.

The preferred embodiments of the present invention will now be described with reference to the drawings. Identical elements in the various figures are designated with the same reference numerals.

This invention concerns an apparatus that combines the outputs of an FM analog PA and a digital PA to one output load, which could be a broadcast antenna. The apparatus has two inputs, one for the analog signal and one for the digital signal, and one output that produces an IBOC spectrum for broadcast transmission. The combiner has identical mild tuned bandpass filters that pass the FM signal with a correctable amount of distortion and only partially reflects the digital signal to produce an output of low loss FM signal and some loss to the digital signal. The lost digital signal is delivered to a dump load where it is absorbed.

Figure 13:
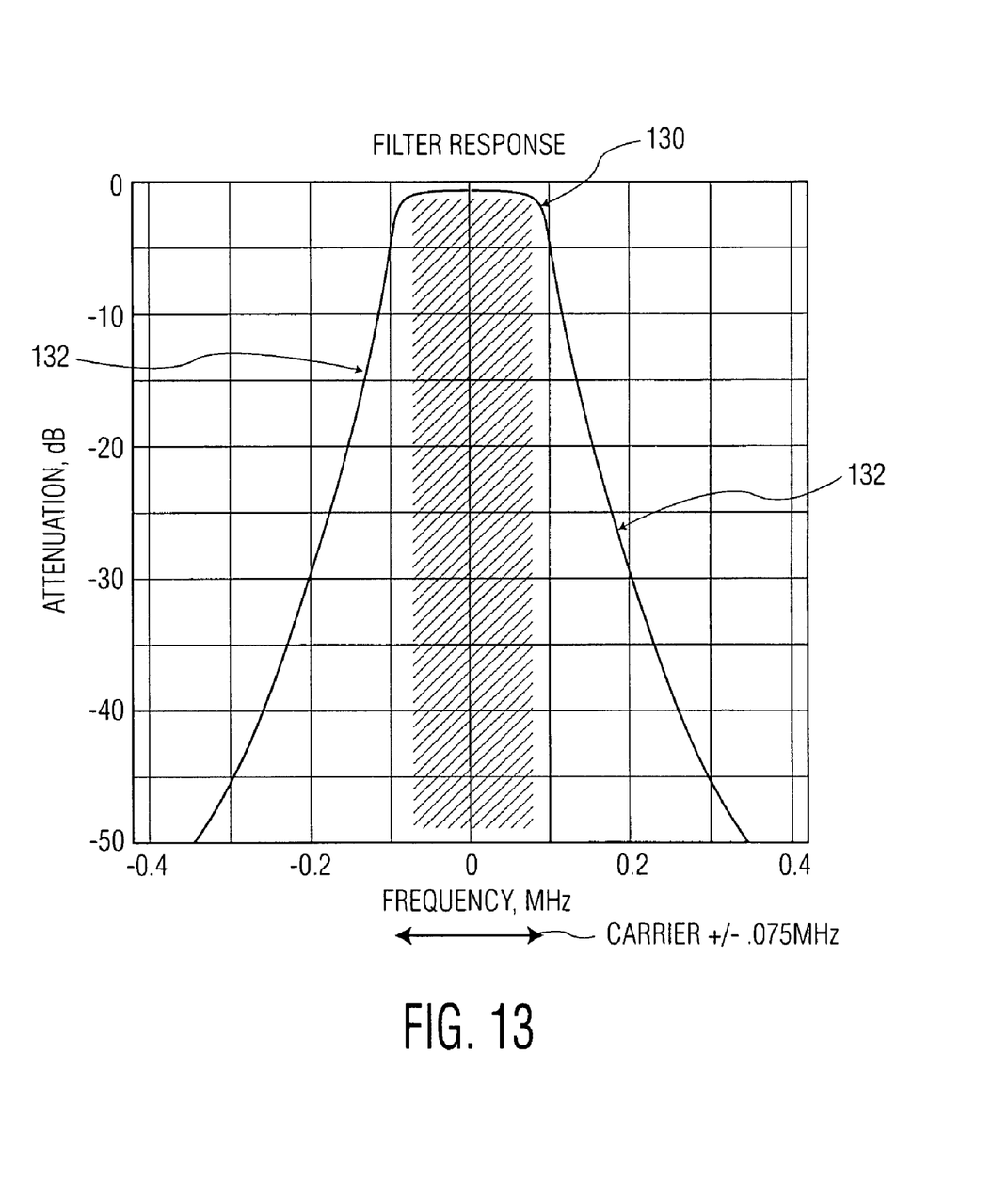
FIG. 13 is a diagram of the filter response, or rejection, from a mild tuned FM combiner using a bandpass filter showing loss (dB) vs. frequency.

With reference to the drawings and in particular FIG. 6 initially, a spectrum diagram of an IBOC signal using the apparatus of the within invention is presented. FIG. 6 shows the signal spectrum distribution of a specific FM channel, or frequency, reference to channel center, displaying the FM analog or "carrier" signal and the digital sideband, or "sub-carrier," signals. The x-axis represents the bandwidth of the channel, wherein each space represents 50 kHz. Referring to FIG. 13, it can be seen that the bandpass filter still straddles the FM carrier by +/−0.075 MHz, where most of the FM power is. Thus, the FM analog signal remains strong. The reduced filter rejection at carrier +/−0.13 MHz, is where the digital sidebands are, or at +/−0.1 MHz for the extended mode of operation. Reduced rejection means some loss to the digital sidebands, Reference is now made to FIG. 9 which illustrates a preferred embodiment of the invention being a mild tuned bandpass filter (MTF) combiner 100 constructed in accordance with the present invention and which is illustrated as having input ports 101 and 102, and a single output port 103. The input ports are illustrated as being connected to the outputs of an FM analog PA 104 and a digital PA 105 which, for example, may receive and amplify an analog or digital signal for a particular FM channel, e.g., channel 102.7 FM. The FM analog signal from analog PA 104 is applied to input port 101, where it is then applied to a pair of identical mild tuned bandpass filters 106 which are tuned to pass only analog FM signals of this channel, while rejecting all other frequencies and noise. The analog signal is split at quadrature hybrid 107 and directed to mild tuned bandpass filters 106, where the split analog signal is passed with only mild and correctable distortion. After exiting the bandpass filters 106 the split analog signal is recombined at output quadrature hybrid 108, and then provided at the output port 103 and forwarded to a load, such as an antenna (not shown) for broadcast transmission.

Figure 9:
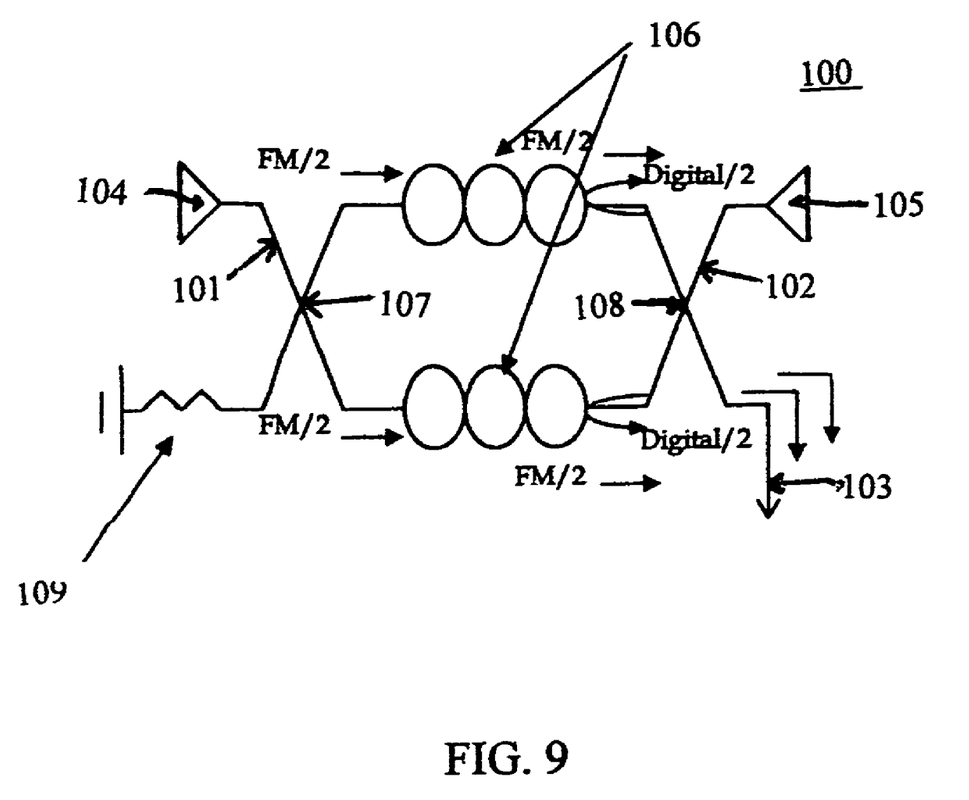
FIG. 9 is a schematic diagram of an embodiment of a mild tuned bandpass filter of the within invention.

Similarly, the digital signal, of the same channel as the analog signal, from digital PA 105 is applied to input port 102, where it is then applied to mild tuned bandpass filters 106 which are tuned to pass only analog FM signals in this channel. Being tuned as such, the digital signal is partially reflected by mild tuned bandpass filters 106, and thus some of the digital signal is "lost." The lost digital signal is delivered to dump load 109 where it is absorbed. The digital signal is split at output quadrature hybrid 108 and directed to mild tuned bandpass filters 106, where the split digital signal is reflected with loss as described. After being reflected from the bandpass filters 106 the split digital signal is recombined at output quadrature hybrid 108, and then provided at the output port 103, where it becomes combined with the recombined analog signal to form an IBOC signal (FIG. 6). The IBOC signal is forwarded to a load, such as an antenna (not shown) for broadcast transmission.

Figure 10:
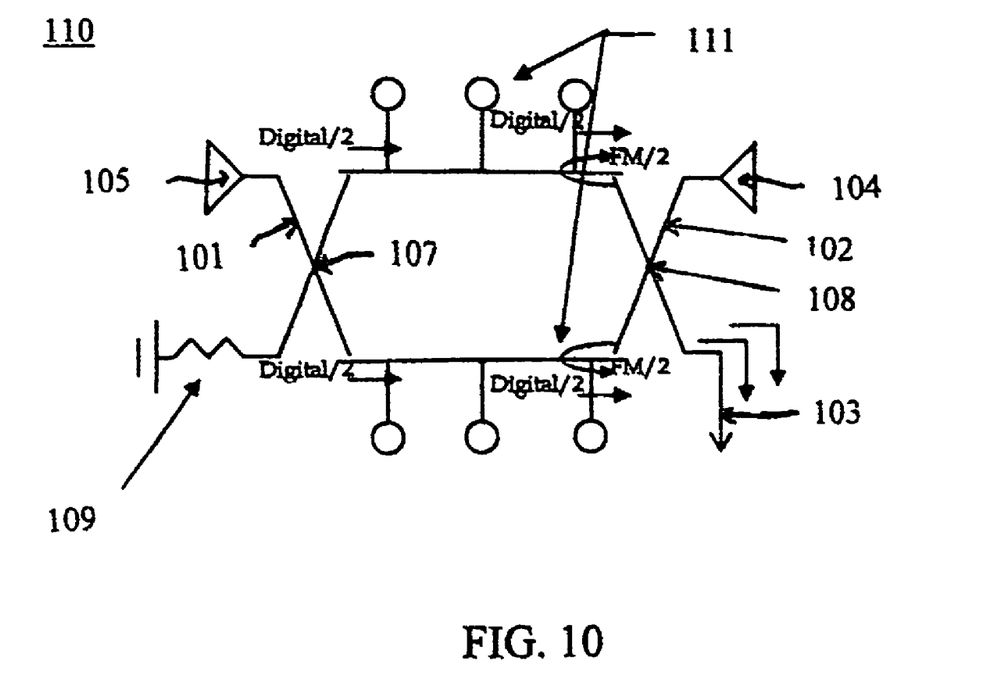
FIG. 10 is a schematic diagram of a further embodiment of a mild tuned notch filter of the within invention.

FIG. 10 illustrates a further preferred embodiment of the invention being a mild tuned notch filter (MTF) combiner 110 constructed in accordance with the present invention and which is illustrated as having input ports 101 and 102, and a single output port 103. The input ports are illustrated as being connected to the outputs of digital PA 105 and an FM analog PA 104 which, for example, may receive and amplify an analog or digital signal for a particular FM channel, e.g., channel 102.7 FM. The digital signal from digital PA 105 is applied to input port 101, and then applied to a pair of identical mild tuned notch filters 111 which are tuned to partially pass only digital signals in this FM channel, while rejecting all other frequencies and noise. The digital signal is split at quadrature hybrid 107 and directed to mild tuned notch filters 111 where the split signal is passed with only mild and correctable distortion. After exiting the notch filters 111 the split digital signal is recombined at output quadrature hybrid 108, and then provided at the output port 103 and forwarded to a load, such as an antenna (not shown) for broadcast transmission.

Similarly, the FM analog signal, of the same FM frequency as the digital signal, from analog PA 104 is applied to input port 102, where it is then applied to mild tuned notch filters 111 which are tuned to partially pass only digital signals in this channel. Being tuned as such, the analog signal is primarily reflected by mild tuned notch filters 111, and thus most of the analog signal is reflected. The small amount of lost analog signal is delivered to dump load 109 where it is absorbed. The analog signal is split at output quadrature hybrid 108 and directed to mild tuned notch filters 111, where the split analog signal is reflected with loss as described. After being reflected from the notch filters 111 the split analog signal is recombined at output quadrature hybrid 108, and then provided at the output port 103, where it becomes combined with the recombined analog signal to form an IBOC signal (FIG. 6). The IBOC signal is forwarded to a load, such as an antenna (not shown) for broadcast transmission.

Figure 11:
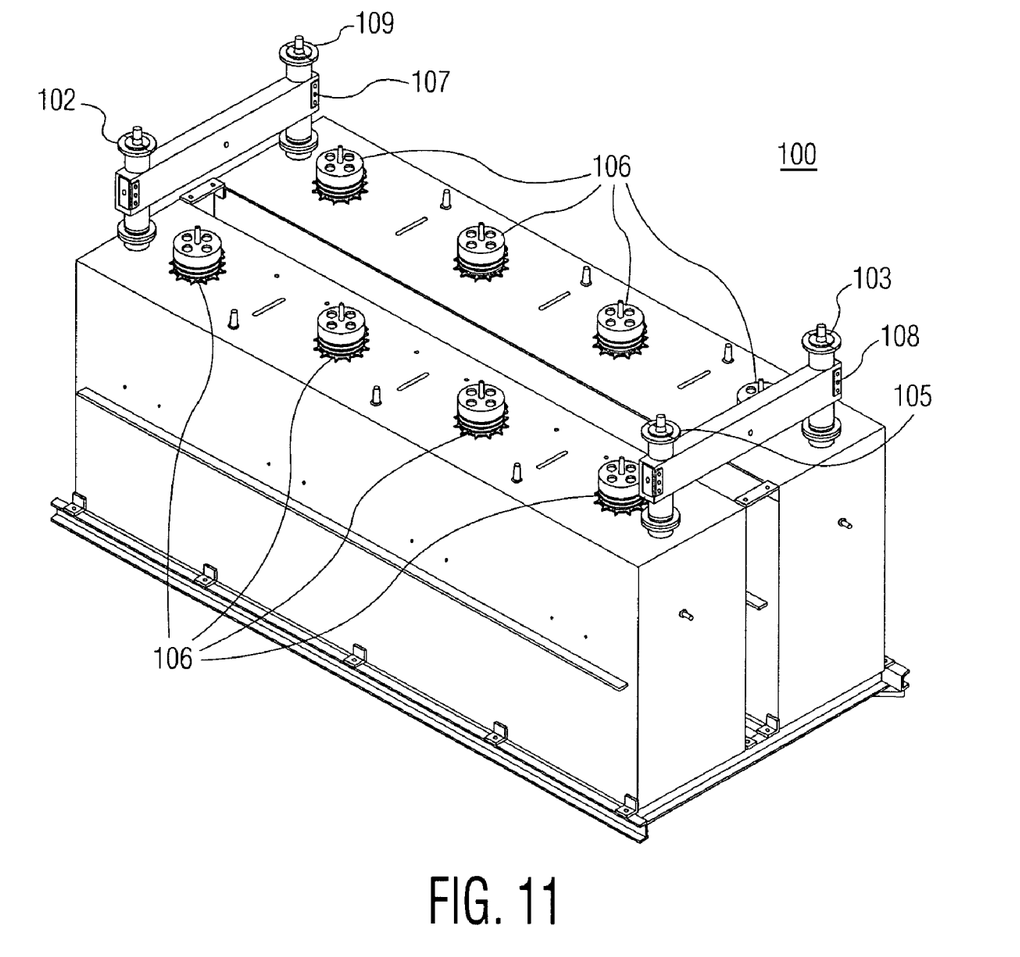
FIG. 11 is a perspective view a mild tuned high power FM directional combiner module of the present invention.
Figure 12:
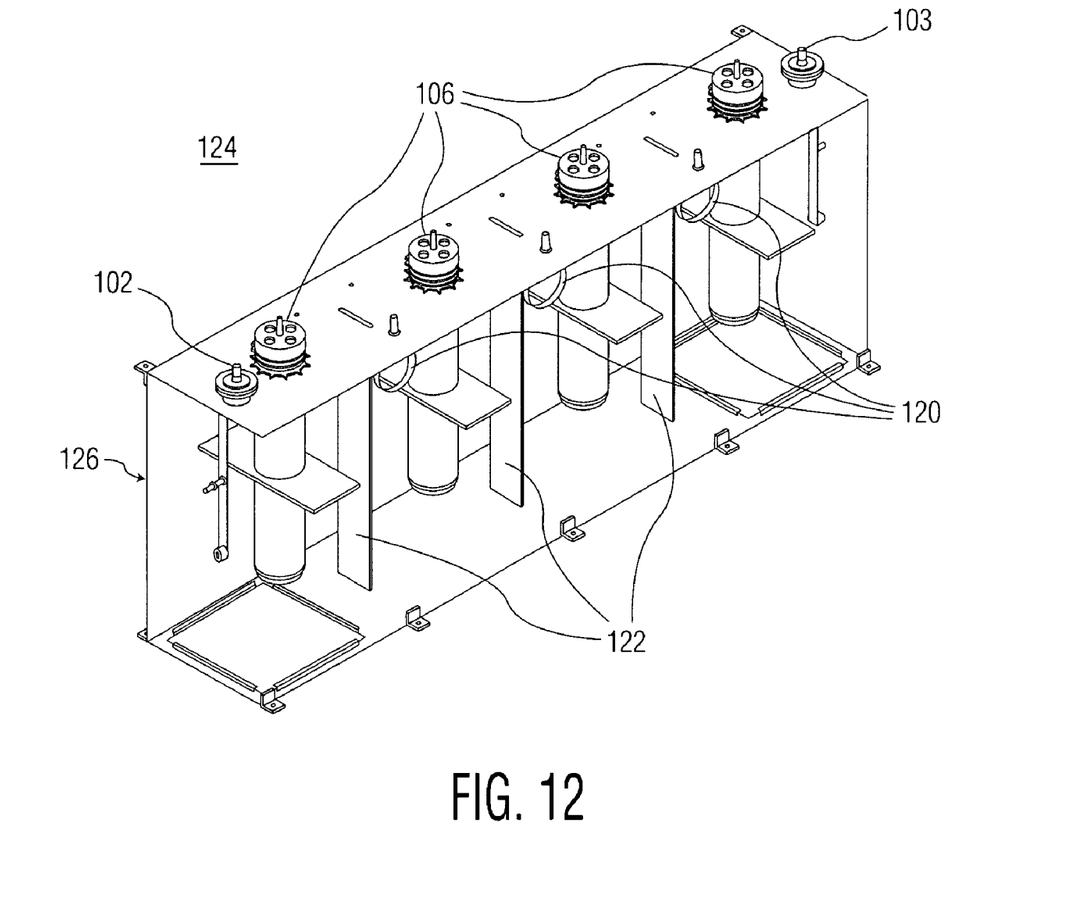
FIG. 12 is a view of the FM filter of the embodiment of FIG. 11.

Referring now to FIGS. 11 and 12, FIG. 11 is a perspective view of an embodiment of the medium loss high power IBOC combiner module of the present invention having mild tuned bandpass filters, and FIG. 12 is a view of the FM filter embodiment of FIG. 11.

The design of the filter begins with the proper selection of cavity geometry to achieve the desired loss. The mid-band insertion loss is approximated by determining the unloaded cavity quality factor $Q_u$. Cavity $Q_u$ varies significantly with manufacturing techniques, materials used, and overall construction of the entire filter. The mid-band insertion loss, $L_o$, is approximated using a well-known formula to those practiced in the art of filter design: $L_o = 4.43 (f_o \Sigma g_i)/(Q_u \Delta f)$. Where $\Delta f$ is the filter bandwidth, $g_i$ are the sum of the lowpass filter element value from 1 to n, and $f_o$ is the filter center frequency. The formula shows that for a given frequency, loss is inversely related to filter bandwidth and cavity Q. At FM frequencies for the application of using filters to combine FM and digital sidebands, the filter gets very narrow and high Q cavities must be used to reduce loss and keep heat due to dissipation loss down.

The cavity design in the preferred embodiment uses high Q combine structure, familiar to those of skill in the art. The resonators in this type of filter consist of TEM-mode transmission line elements that are short circuited on one end and have a lumped capacitance on the other. The capacitance on the other end reduces the length of line to less than a quarter wave. High power applications tend to minimize this capacitance due to flash-over considerations and therefore the resonators tend to be closer to a quarter wave long.

The resonators are coupled to one another by the use of coupling loops 120 and decoupling vanes 122. See FIG. 12, which illustrates a quarter wave resonator 124 and its support 126. Without any vanes, the coupling tends to be too great unless the resonators are spaced further apart. In order to save space, decoupling vanes 122 are used along with coupling loops 120 to fine adjust the coupling between resonators.

The filter response is a function of the coupling values between resonators. In the preferred embodiment, a Chebyshev response and hence, coupling values are used. The filter is tuned using the following Chebyshev inputs to determine the filter response and resulting coupling values:

n=4, a four section filter
Vswr=1.15
Bandwidth=0.18 MHz

Prior to this invention, no FM filters used for combining applications have been this narrow with such little rejection at the channel being combined have been known. The typical bandwidth is 0.4 MHZ and filters used for channel combining applications have been wider than this with significantly more rejection. Second, when sharp tuned filters were discussed, it was thought that enough attenuation must be achieved to substantially combine the digital sidebands. For example, comparing "sharp tune" approach with the new "mild tune" approach, the sharp tune approach uses (see FIG. 8):

n=8, an eight section filter
vswr=1.15
bandwidth=0.195 MHz
normalized attenuation poles at 1.07 and 1.19.

In contrast, the mild tune approach uses the following Chebychev response (see FIG. 13):

n=4, a four section filter
Vswr=1.15
Bandwidth=0.16 MHz

Note the difference in rejection at +/−0.1 MHz off center frequency. The sharp tuned approach has significant rejection for low loss combining of the digital sidebands. The problem is the loss at the FM channel at center and too much roll-off at +/−0.075 MHz. The high dissipation losses result in too much heat on the filter.

Figure 15:
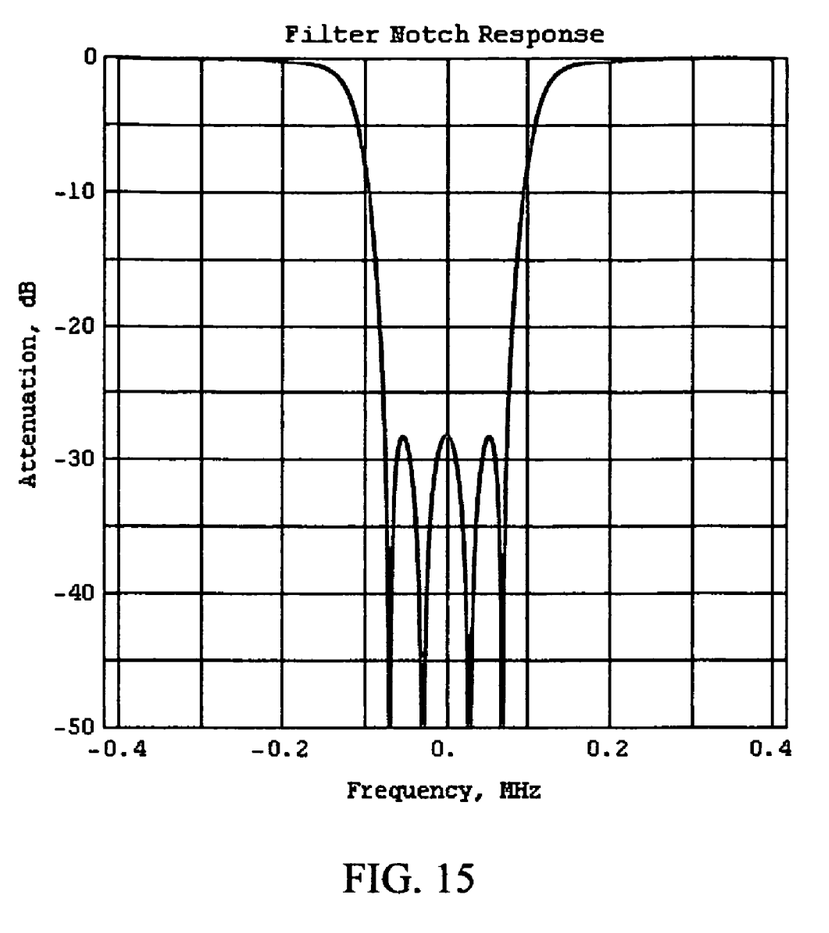
FIG. 15 is a diagram of the filter response, or rejection, from a mild tuned FM combiner using a notch filter showing loss (dB) vs. frequency.

Accordingly, the filter response curve for the preferred embodiments of the invention using either mild tuned bandpass filters or mild tuned notch filters is shown in FIGS. 13 and 15. Specifically, FIG. 13 shows the filter response for a 4-section mild tuned bandpass filter, and FIG. 15 shows the filter response for a 4-section mild tuned notch filter. Again, the x-axis indicating frequency is in 50 kHz units. The band of +/−0.075 MHz is indicated by the shaded area in the graph. FIG. 13 demonstrates a strong pass through of the analog FM signal 130 and shows significantly less rejection at the edge of the digital sidebands 132 (+/−0.13 MHz), making for a lossy digital sideband combiner.

Figure 14:
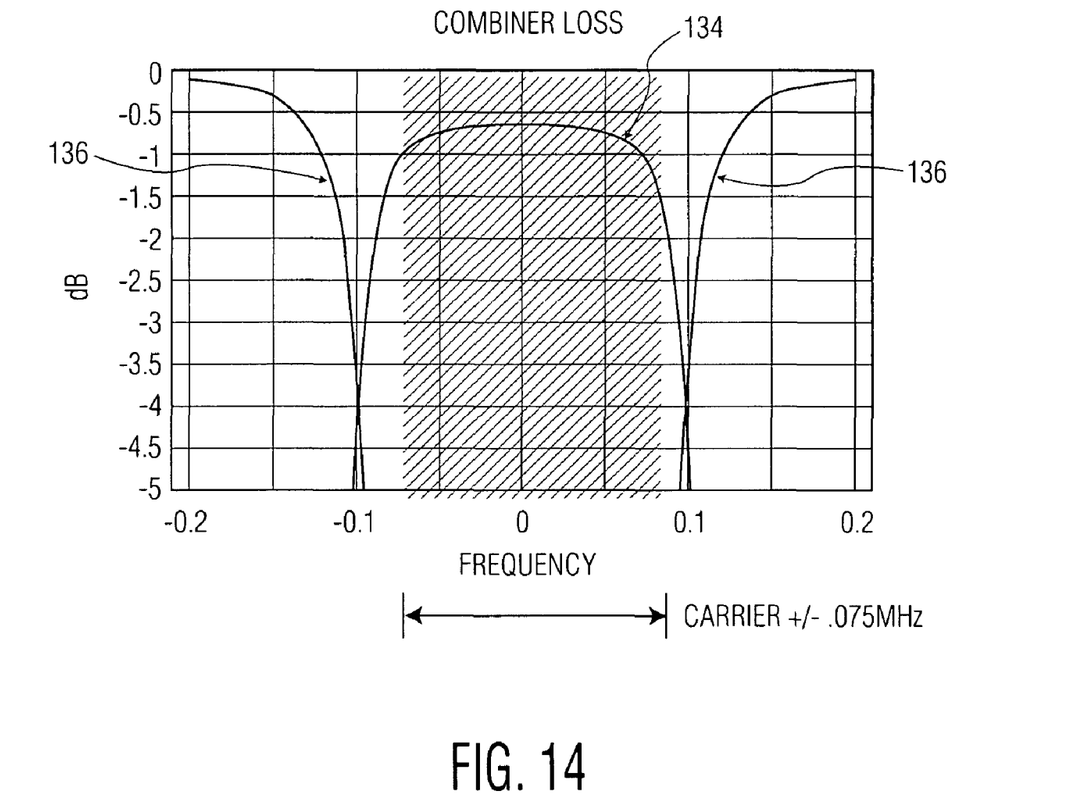
FIG. 14 is a diagram of the combiner losses of a mild tuned high power FM directional combiner, showing loss (dB) vs. frequency.

FIG. 14 illustrates the actual combiner loss, or rejection, for this embodiment, showing the loss for the FM analog signal 124 and the loss for the sideband digital signal 136. Again, the deviation of +/−0.075 MHz from the specific frequency of the desired signal is indicated by the shaded area in the graph. Regarding the analog FM signal 134, FIG. 14 shows a 0.65 dB mid-band loss with 0.35 dB loss variation. Also, there is a 0.8 dB integrated loss over carrier within the +/−0.075 MHz range guideline. Regarding the digital loss 136, FIG. 14 shows a 0.85 dB integrated loss over the digital sideband, with 4.0 db loss variation, in the extended mode.

Accordingly, the embodiments of the within invention provide a lossy combiner with acceptable loss variations over the current approaches. As discussed, the mild tuned bandpass and notch filters produce a digital loss of about 0.85 dB, compared to digital losses of between 3 to 6 dB from the high power sharp tuned combiners. The loss and delay variations put on the digital signal can be pre-corrected by methods known to those of skill in the art. In addition, the loss and the delay variations for the FM analog signal are within acceptable ranges. Transmitters currently in use have sufficient headroom to overcome the integrated loss and the delay variations can be corrected by methods known to those of skill in the art.

Accordingly, as can be seen by the description of the preferred embodiments, the advantages of the within mild tuned filer combiner over a sharp-tuned filter combiner include: the filter requirement can be met by 4-section filters, rather than the 8-section filters; the signal and variation losses are reduced; roll-off is down and correctable in the transmitter; there is less rejection resulting in higher losses on the digital sidebands, but they are acceptable and correctable in the digital transmitter; the cost is reduced, as well as complexity and size.

The preceding preferred embodiments are illustrative of the practice of the invention. It is to be understood, however, that other expedients known to those of skill in the art, or disclosed herein, may be employed without departing from the spirit of the invention or the scope of the claims.

What is claimed is:

1. An apparatus for combining an FM signal with a digital signal of the same channel to form an IBOC signal, comprising:

a first input for an FM signal and a second input for a digital signal, an input quadrature hybrid connected to said first input for splitting said FM signal and applying said split FM signal to an input of a pair of RF filters tuned to pass the FM signal and to partially reflect the digital signal, an output quadrature hybrid connected to said second input for splitting said digital signal, applying said split digital signal to an output of said pair of RF filters, and recombining the partially reflected split digital signal, and a single load output connected to said output quadrature hybrid, wherein, said split FM signal passes through said pair of RF filters and is recombined at the output quadrature hybrid and said partially reflected split digital signal is recombined at the output quadrature hybrid and is further combined with the recombined FM signal at the output quadrature hybrid to form an IBOC signal, which is directed to said single load output.

2. The apparatus of claim 1, wherein said pair of RF filters are identically tuned RF filters.

3. The apparatus of claim 2, wherein said pair of identically tuned RF filters are bandpass filters.

4. The apparatus of claim 3, wherein said bandpass filters are four section filters.

5. The apparatus of claim 3, wherein part of said split digital signal is not reflected by said pair of RF filters and results in a partial loss to said digital signal.

6. The apparatus of claim 5, further comprising a dump load for dissipating the lost portion of the digital signal.

7. The apparatus of claim 5, wherein the loss to said digital signal is about 0.85 dB integrated loss over the digital sideband, with 4.0 db loss variation, in an extended mode.

8. The apparatus of claim 5, wherein there is loss to said FM signal of about 0.65 dB mid-band loss with 0.35 dB loss variation.

9. An apparatus for combining an FM signal with a digital signal of the same frequency to form an IBOC signal, comprising:
    a first input for a digital signal and a second input for an FM signal,
    an input quadrature hybrid connected to said first input for splitting said digital signal and applying said split digital signal to an input of a pair of RF filters tuned to partially pass the digital signal and to reflect the FM signal,
    an output quadrature hybrid connected to said second input for splitting said FM signal, applying said split FM signal to an output of said pair of RF filters, and recombining the reflected split FM signal, and
    a single load output connected to said output quadrature hybrid,
    wherein, said split digital signal partially passes through said pair of RF filters and is recombined at the output quadrature hybrid and said reflected split FM signal is recombined at the output quadrature hybrid and is further combined with the recombined digital signal at the output quadrature hybrid to form an IBOC signal, which is directed to said single load output.

10. The apparatus of claim 9, wherein said pair of RF filters are identically tuned notch filters.

11. The apparatus of claim 9, wherein said notch filters are four section filters.

12. A method of combining an FM signal with a digital signal to form an IBOC signal, comprising;
    splitting an FM signal from a first amplifier into two FM signals by an input quadrature hybrid;
    applying the two split FM signals from said input quadrature hybrid to the inputs of a pair of identical high power RF filters tuned to pass through said FM signal and to partially reflect a digital signal of the same channel as the FM signal;
    passing said split FM signals through said pair of identical high power RF filters;
    recombining said split FM signal from said pair of high power RF filters by an output quadrature hybrid;
    splitting a digital signal from a second amplifier into two digital signals by said output quadrature hybrid;
    applying the split digital signal from said output quadrature hybrid to said pair of identical high power RF filters;
    partially reflecting said two split digital signals from said pair of identical high power RF filters;
    recombining said partially reflected split digital signal from said pair of high power RF filters by said output quadrature hybrid;
    combining said recombined FM signal and said recombined digital signal at said output quadrature hybrid to form an IBOC signal; and
    directing said IBOC signal to a single output load,
    wherein, said digital signal is only partially passed through said pair of high power RF filters, resulting in a partial loss of the digital signal.

13. The method of claim 12, wherein said pair of high power RF filters are bandpass filters.

14. The method of claim 13, wherein said split digital signal is partially reflected by said pair of bandpass filters.

15. The method of claim 12, wherein the partially reflected digital signal is directed to a dump load.

16. The method of claim 12, wherein said tuning of said high power RF filters provides minimal signal loss variation to said FM signal and mild signal loss to said digital signal.

17. The method of claim 16, wherein said loss to said FM signal is about 0.65 dB mid-band loss with 0.35 dB loss variation, and said loss to said digital signal is about 0.85 dB integrated loss over the digital sideband, with 4.0 db loss variation in an extended mode.

18. The method of claim 17, wherein said mid-band loss and said loss variation of said FM signal is correctable.

19. The method of claim 17, wherein said integrated loss and said loss variation of said digital signal is correctable.

* * * * *